Aug. 3, 1965
H. R. McDANIEL
3,198,545
AUTOMOTIVE ROAD SPRAY SHIELD
Filed May 6, 1963
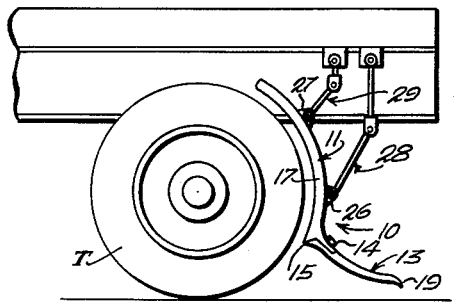
Fig. 1
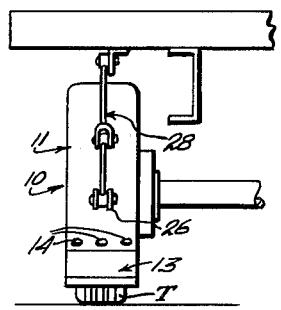
Fig. 2
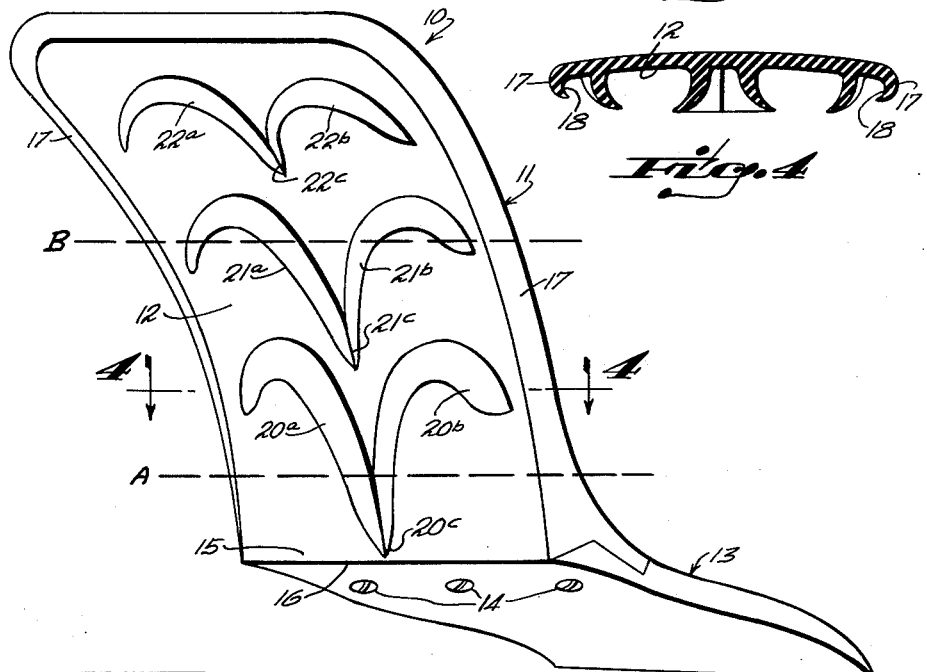
Fig. 4
Fig. 3
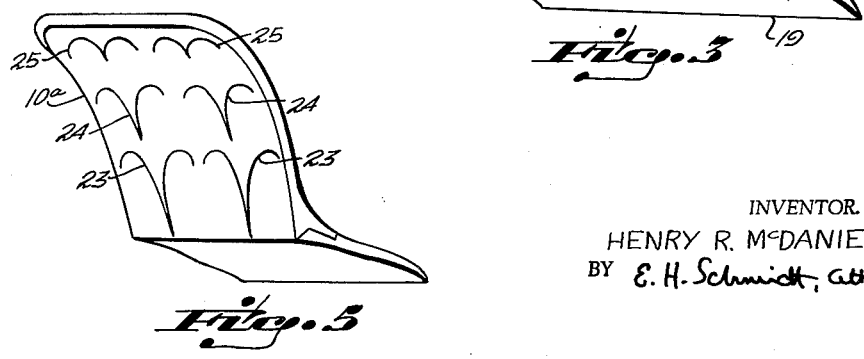
Fig. 5
INVENTOR.
HENRY R. McDANIEL
BY E. H. Schmidt, Atty.

3,198,545
AUTOMOTIVE ROAD SPRAY SHIELD
Henry R. McDaniel, 3358 SW. 2nd St., Miami, Fla.
Filed May 6, 1963, Ser. No. 278,208
5 Claims. (Cl. 280—154.5)

My invention relates to automotive vehicles and is directed particularly to an improved spray shield for automobile and truck tires.

Heretofore, spray shields for truck and automobile tires have consisted of substantially flat aprons of rubber, fabric or other flexible material extending down to a short distance from the ground behind the wheels, usually the rear wheels. Such shields not only are apt to fly backwardly, particularly at high speeds, and thus become totally ineffective in stopping rearward spray onto the windshields of following vehicles, but also have a great tendency to divert any water picked up by the tires sidewardly, where it splatters upon passing vehicles and pedestrians.

It is accordingly the principal object of my invention to provide an improved splash guard for wheeled vehicles wherein water picked up by the tires and projected rearwardly will be directed to flow harmlessly to the ground, and thus substantially eliminate any sideward splashing.

It is a more particular object to provide a splash guard of the character above described, the side facing the tire of which is formed with channel means dividing and directing the flow of the impinging water along flow paths serving to dissipate kinetic energy and ultimately discharge the water in downward flow to the road.

Yet another object is to provide an improved splash shield or guard of the above nature which can readily be adjustably fixed behind all types of wheeled vehicle tires, whether single or dual, and which will be simple in structure, low in cost, and dependable and durable in use.

Other objects, features and advantages of the invention will be apparent from the following description when read with reference to the accompanying drawings.

In the drawings, wherein like reference numerals denote corresponding parts throughout the several views:

FIG. 1 is a side view of the rear portion of a truck equipped with a spray shield embodying the invention;

FIG. 2 is a rear view of the spray shield illustrated in FIG. 1;

FIG. 3 is a perspective view of the inside of a tire splash guard embodying the invention, shown separately and on an enlarged scale;

FIG. 4 is a transverse cross-sectional view taken along the line 4—4 of FIG. 3 in the direction of the arrows; and FIG. 5 illustrates, schematically, another embodiment of the invention adapted for use with dual tired wheels.

Referring now in detail to the drawings, 10 in FIG. 3 illustrates, in perspective view as seen from the inside (the side to face the tire), a spray shield embodying the invention, the same preferably being molded of rubber or a tough synthetic plastic, and comprising a longitudinally-curved upper body portion 11 providing a concave inner surface portion 12. The body portion 12 abuts at its lower end a reversely-curved tail portion 13, which may be formed integrally with the upper body portion 11 or formed separately, as illustrated, and joined thereto as by a plurality of bolts or other fasteners 14.

The lower end of the body portion 11 and the end of the tail portion 13 adjacent thereto are so formed as to provide a laterally-extending protruding portion 15 defining a line peak 16 which serves to separate a stream of water impinging thereupon and direct the lower portion downwardly along the inner surface of said tail portion, and direct the upper portion into channels formed upon the inside of said body portion, as is hereinbelow more fully described.

As illustrated in FIGS. 3 and 4, the body portion 11 is slightly rounded to provide the concave inner surface portion 12, and the periphery of the spray shield 10 is formed with short, inwardly-curved peripheral wall portions 17 which define channels 18 for directing the flow of peripheral water, as is hereinbelow more fully described. The outer end of the tail portion 13 is formed with a slightly downwardly-curved lip 19.

As illustrated in FIGS. 3 and 4, the concave inner surface portion 12 of the spray shield 10 is also formed with a pair of arcuate lower ridges 20a, 20b, which are symmetrically placed about the longitudinal axis of the shield, and which begin substantially at the lower end of the upper body portion 11 and extend upwardly and then outwardly and downwardly to each side. The ridges are curved inwardly along their height to provide flow channels serving to redirect water impinging upwardly into a reverse and outward and downward course to be caught in the peripheral wall channels 18 and discharged downwardly. The concave inner surface portion 12 of the spray shield 10 is also formed with intermediate and upper arcuate ridge pairs 21a, 21b and 22a, 22b, similar to the ridges 20a and 20b, but not necessarily as great in height, which serve to catch and redirect downwardly and outwardly water impinging at higher zones against the upper body portion 11.

FIGS. 1 and 2 illustrate a truck equipped with a single tire spray shield 10 embodying the invention, the same being secured in place behind a rear tire T by adjustable linkages 28, 29 interconnecting the truck with lug members 26, 27, respectively, formed in the back of said shield.

In use, it has been found in practice that water picked up from the road by a revolving tire is thrown rearwardly in a more or less solid stream from the center of the tire tread, and is directed upwardly at various angles depending principally upon the amount of water on the road and the speed of the vehicle, the greater the speed, the higher the stream. If the water stream impinges upon the peaked protruding portion 15, it will be divided, part being directed along the underside of the tail portion 13 and thence downwardly, and the remainder upwardly, and then outwardly and downwardly by virtue of the curved ridges 20a, 20b, as described above. Water that impinges upwardly at a higher position along the inside of the tire shield 10, say at a position between the broken lines A and B in FIG. 3, will be redirected downwardly by one or more pairs of the arcuate ridges 20a, 20b; 21a, 21b; 22a, 22b. In the course of travel in the flow channels provided by the ridges and the peripheral wall portions 17, the kinetic energy of the water stream will, for the most part, be dissipated, so that it falls with minimum force back upon the roadway, without secondary splashing.

FIG. 5 illustrates schematically dual tire spray shield 10a, embodying the invention, the same differing from that of FIGS. 1 through 4 described above only in that it is wider, and formed with two sets of side-by-side ridge pairs 23, 24 and 25 to accommodate the side-by-side arrangement of dual tires. Operation is otherwise the same as that described above in connection with the single tire embodiment of FIGS. 1 through 4.

It is to be noted that an advantage in having the tail portion 13 separable from the upper body portion 11 resides in the fact that it is vulnerable to damage caused by improper backing up against obstructions, and when so damaged, can readily be replaced without the necessity of replacing the entire spray shield unit.

While I have illustrated and described herein only one form in which the invention may conveniently be embodied in practice, it is to be understood that this form is given by way of example only and not in a limiting sense. The invention, in brief, comprises all the modifications and embodiments coming within the scope of the following claims.

What I claim as new and desire to secure by Letters Patent is:

1. An automotive road spray shield comprising, in combination, a curved body member adapted to be placed in spaced relation behind a vehicle tire, and said body member having a concave inner surface and an inwardly-directed peripheral wall, said peripheral wall providing water flow channels for directing water downwardly by gravity flow from said inner surface, said inner surface having a pair of arcuate ridges extending upwardly from the longitudinal center of said body member at the lower end thereof, thence outwardly to each side and thence downwardly, said pair of ridges being curved along their height to provide flow channels for redirecting downwardly, water impinging in an upward direction upon said inner surface.

2. An automotive road spray shield as defined in claim 1, including a second pair of arcuate ridges on said inner surface in alignment with and vertically spaced upwardly from said first pair of ridges.

3. An automotive road spray shield as defined in claim 2, including a third pair of arcuate ridges in said inner surface in alignment with and vertically spaced upwardly from said second pair of ridges.

4. An automotive road spray shield as defined in claim 3, including a tail member joined to the lower end of said body member and providing a backwardly-extending substantially flat surface.

5. An automotive road spray shield as defined in claim 4, wherein the juncture of said body member and said tail member forms a peaked projection serving to divide a stream of water impinging thereon into upwardly and backwardly directed stream portions.

References Cited by the Examiner

UNITED STATES PATENTS

| | | | |
|---|---|---|---|
| 1,713,405 | 5/29 | Stansfield | 280—152 |
| 1,759,793 | 5/30 | Lund | 280—152 |
| 2,714,015 | 7/55 | Sherman | 280—154.5 |
| 2,831,702 | 4/58 | Eaves | 280—154.5 |
| 3,027,178 | 3/62 | Eaves | 280—154.5 |

PHILIP ARNOLD, *Primary Examiner.*

LEO FRIAGLIA, *Examiner.*